United States Patent
Dhamankar et al.

(10) Patent No.: US 11,218,468 B2
(45) Date of Patent: Jan. 4, 2022

(54) MSISDN REQUEST HANDLING FOR IDENTITY FRAUD MANAGEMENT

(71) Applicant: T-Mobile USA, Inc., Bellevue, WA (US)

(72) Inventors: Shailendra Dhamankar, Issaquah, WA (US); Krishnaraj Babu, Cumming, GA (US); Shelby Seward, North Bend, WA (US); Srinivas Meka, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 288 days.

(21) Appl. No.: 16/291,907

(22) Filed: Mar. 4, 2019

(65) Prior Publication Data

US 2019/0281040 A1    Sep. 12, 2019

Related U.S. Application Data

(60) Provisional application No. 62/639,382, filed on Mar. 6, 2018.

(51) Int. Cl.
*H04L 29/06* (2006.01)
*G06Q 20/08* (2012.01)
(Continued)

(52) U.S. Cl.
CPC ......... *H04L 63/083* (2013.01); *G06Q 20/085* (2013.01); *H04L 61/2007* (2013.01); *H04W 8/18* (2013.01)

(58) Field of Classification Search
CPC . H04L 63/083; H04L 61/2007; G06Q 20/085; H04W 8/18
See application file for complete search history.

(56) References Cited

U.S. PATENT DOCUMENTS 6,977,917 B2   12/2005   Skog et al.
9,152,727 B1   10/2015   Balducci et al.
(Continued)

FOREIGN PATENT DOCUMENTS

EP    2950567 A1 *  12/2015   ............. H04W 4/21

OTHER PUBLICATIONS

International Application No. PCT/US2019/020797, International Search Report and Written Opinion dated Jun. 21, 2019, 13 pages.
(Continued)

*Primary Examiner* — Arvin Eskandarnia
(74) *Attorney, Agent, or Firm* — Han Santos, PLLC

(57) ABSTRACT

Techniques are described for delivering subscriber information of a subscriber of a wireless carrier network to an authorized partner. The techniques include receiving, from a requesting entity device, a request for subscriber information of a subscriber, the request comprising a public Internet Protocol (IP) address of a user device associated with the subscriber, determining whether the requesting entity device is associated with an authorized partner based at least on one or more credentials associated with the requesting entity device, in response to determining that the requesting entity device is associated with the authorized partner, routing the request to at least one subscriber database of a plurality of subscriber databases to obtain the subscriber information using the public IP address of the user device, and transmitting the subscriber information of the subscriber to the requesting entity device.

20 Claims, 5 Drawing Sheets

(51) Int. Cl.
*H04W 8/18* (2009.01)
*H04L 29/12* (2006.01)

(56) References Cited

U.S. PATENT DOCUMENTS

| | | | |
|---|---|---|---|
| 2007/0174214 A1* | 7/2007 | Welsh | G06Q 20/4016 |
| | | | 705/405 |
| 2010/0185546 A1 | 7/2010 | Pollard | |
| 2010/0228658 A1* | 9/2010 | Ketelsen | G06Q 40/02 |
| | | | 705/35 |
| 2012/0259970 A1 | 10/2012 | Hu et al. | |
| 2013/0273886 A1* | 10/2013 | Mohajeri | H04W 12/02 |
| | | | 455/411 |
| 2014/0003313 A1* | 1/2014 | Jain | H04W 52/0212 |
| | | | 370/311 |
| 2014/0081846 A1 | 3/2014 | Gallagher et al. | |
| 2014/0207941 A1 | 7/2014 | McCann | |
| 2015/0161622 A1 | 6/2015 | Hoffmann et al. | |

OTHER PUBLICATIONS

European Patent Application No. 19765016.1, Search Report dated Aug. 13, 2021, 8 pages.

* cited by examiner

MSISDN REQUEST HANDLING FOR IDENTITY FRAUD MANAGEMENT

CROSS-REFERENCE TO RELATED APPLICATIONS

This application is related to U.S. Provisional Patent Application Ser. No. 62/639,382, filed Mar. 6, 2018, entitled, "MSISDN Request Handling for Identity Fraud Management," which is hereby incorporated by reference in its entirety.

BACKGROUND

A telecommunications service provider of a wireless carrier network may at times share subscriber information such as the Mobile Station International Subscriber Directory Numbers (MSISDNs) of its subscribers with authorized partners and/or aggregators for identity verification and fraud prevention. Additionally, the MSISDNs of subscribers may be used by internal departments of the wireless carrier network, such as billing, resource planning, and engineering to identify subscribers for resolving subscriber billing issues, user device issues, network infrastructure component issues, and/or other problems. Governmental regulations may mandate that uses of the MSISDNs of the subscribers by the various entities are done in a manner that protects the privacy and/or anonymity of the subscribers. For example, such governmental regulations may include the Telephone Consumer Protection Act of 1991 enacted in the United States or the General Data Protection Regulation (GDPR) promulgated by the European Union.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
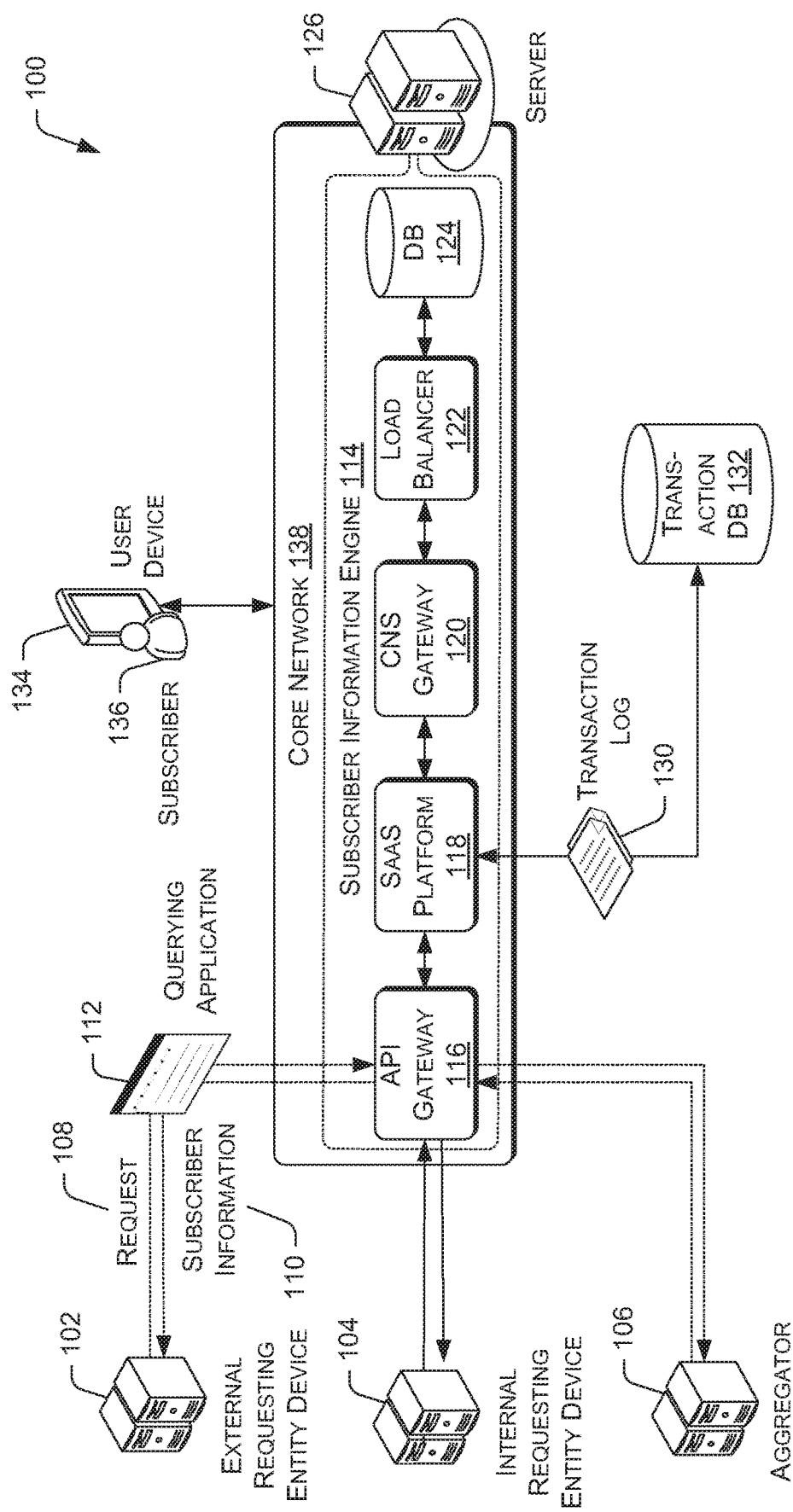
FIG. 1 illustrates example network architecture for providing subscriber information to authorized partners for identity verification and fraud prevention.

The techniques described herein are used by a wireless carrier network to protect the MSISDNs of its subscribers from unauthorized access, thereby limiting the access of the MSISDNs to authorized partners. An MSISDN is a number uniquely identifying a subscription in a Global System for Mobile (GSM) or a Universal Mobile Telecommunications System (UMTS) mobile network. The MSISDN may be a telephone number that is mapped to a subscriber identification module (SIM) card in a user device, such as a mobile phone of a subscriber. The MSISDN is unique in the network and across multiple networks, and a mobility number portability (MNP) function allows a subscriber to retain his or her MSISDN even if the subscriber changes his or her mobile network operator (MNO).

The authorized partners may include mobile virtual network operators (MVNOs), virtual network operators (VNOs), or mobile other licensed operators (MOLOs). These authorized partners may resell the telecommunication services offered by the wireless carrier network, and/or offer additional telecommunication related services to the subscribers of the wireless carrier network. The authorized partners may also include aggregators and identity fraud management (IFM) providers. An aggregator is a service provider having a platform for engaging mobile device users. An IFM provider is a service provider having a contractual agreement with a telecommunications service provider of the wireless carrier network to license subscriber information that can include MSISDN information for the purpose of serving their downstream clients with identity verification and fraud prevention data. For example, a client, such as a merchant or a bank, may have a contractual agreement with an IFM provider to use the MSISDNs of subscribers (i.e., the client's customers) that are supplied by the IFM provider to perform customer identity verification and fraud prevention.

Subscriber information such as the MSISDN can be retrieved from a Policy and Charging Rules Function (PCRF) that operates at the core network. The PCRF can access subscriber databases and other specialized functions, such as a charging system, in a centralized manner. In some embodiments, a subscriber information engine of the telecommunications service provider may receive a request for the MSISDN of a subscriber that originates from a querying application on a computing device of an authorized partner. The request can be an external request or an internal request. The external request can originate from an authorized partner (e.g., an IFM provider, an aggregator, etc.) that is not the telecommunications service provider. Conversely, the internal request can originate from various internal departments of the telecommunications service provider.

In the former scenario, the querying application may be an IFM application or an application that services an IFM application. The subscriber information engine may execute on a computing device located in a core network of the telecommunications service provider. The computing device of the authorized partner may send the request to the subscriber information engine via a network (e.g., the Internet). In order to securely process requests for subscriber information, the request may be submitted over an encrypted Hypertext Transfer Protocol Secure (HTTPS) channel. The request may include the public Internet Protocol (IP) address of a user device that belongs to a subscriber. The public IP address comprises an Internet Protocol version 6 (IPv6) address. The PCRF supports the utilization of IPv6, which eliminates the requirement for Network Address Translation (NAT) that is required for Internet Protocol version 4 (IPv4). The public IP address can uniquely identify the user device at the time the request is submitted. Additionally, the public IP address of the user device can remain the same even if the subscriber swaps the user device's SIM card. It is contemplated, however, that other identifiers associated with or coupled to the user device that belongs to the subscriber may be used in addition to or instead of the public IP address.

The subscriber information engine may use an IP address-to-subscriber information mapping database. In various embodiments, the IP address-to-subscriber information mapping database can be an IP address-to-MSISDN mapping database that is used by the PCRF to obtain a subscriber's MSISDN. The IP address-to-subscriber information mapping database can include IP address-to-subscriber information mapping information that can be used to obtain subscriber information of the subscriber that is associated with the user device corresponding to the public IP address. In various embodiments, the IP address-to-subscriber information mapping database can comprise a lookup table. IP address-to-subscriber information mapping information can also be cached in a local resident memory of the subscriber information engine for repeated requests in order to process the repeated requests in an efficient manner The subscriber information engine may serve the subscriber information of the subscriber to the querying application on the computing device of the authorized partner.

The subscriber information engine of the carrier may also receive an internal request for the MSISDN of the subscriber that originates from a querying application on a computing device of the wireless carrier network. The querying application may be a billing application, a resource management application, a customer relationship management (CRM) application, a point-of-sale (POS) application, or another application employed by an internal department of the wireless carrier network. The computing device may send the request to the subscriber information engine via an internal network of the telecommunications service provider. The computing device transmitting the internal request can be automatically authenticated. The request may include the public IP address of a user device that belongs to a subscriber. The PCRF may use the IP address-to-MSISDN mapping database to obtain an MSISDN of a subscriber that is associated with the user device corresponding to the public IP address. The subscriber information engine may serve the MSISDN of the subscriber to the querying application on the computing device of the wireless carrier network.

In various embodiments, a transaction log in a transaction database may store transaction information relating to delivery of MSISDN information in response to a request. For example, the transaction log may track an originator (e.g., an authorized partner) of the request, the data sought by the request, the time stamp (e.g., time and date) of the request and/or response to the request, the data (e.g., MSISDN) that is supplied in response to the request, success or failure of the request, reason for the failure of the request, and/or other information pertaining to the transaction. Additionally, a notification function can access the transaction log to notify the subscriber of each transaction. Notifications can be provided in real time, in near-real time, or on a scheduled basis via a user application that may at least partially reside on a user device of the subscriber. Without limitations, a notification can indicate the originator of the request, the data sought by the request, the time stamp of the request, the data that is supplied in response to the request, and/or so forth. In various embodiments, the notification function can also transmit a fraud alert to a user device of a subscriber when an unauthorized partner submits a request for the subscriber's MSISDN and/or the request fails.

In various embodiments, an external request or an internal request may also seek additional types of subscriber information or subscriber data attributes of a subscriber from the subscriber information engine. Accordingly, the subscriber information engine may return the additional types of subscriber information along with the MSISDN of the subscriber. The additional types of subscriber information that are returned for a subscriber may include data such as a first and last name of the subscriber, business name, account type, customer type, subscriber status, primary account holder (PAH) information, last mobile number change data, last billing name change date, last billing address change date, International Mobile Subscriber Identity (IMSI) activation date, International Mobile Equipment Identity (IMEI) first use date, last IMEI change date, MSISDN porting information, billing address, device lost/stolen information, roaming status, call forwarding status, and/or so forth.

The techniques described herein may be implemented in a number of ways. Example implementations are provided below with reference to the following figures.

Example Network Architecture

FIG. 1 illustrates an example architecture 100 for providing subscriber information to authorized partners for identity verification and fraud prevention. The architecture comprises one or more computing devices in connection with a network. The computing devices can comprise an external requesting entity device 102 that is operated by an authorized partner such as an MVNO, a VNO, a MOLO, an IFM provider, an internal requesting entity device 104 that is operated by a telecommunications service provider or an internal department of the wireless carrier network, an aggregator 106, and/or so forth. It is contemplated that an authorized partner, a telecommunications service provider, and/or an aggregator has consent from a subscriber 136 of a telecommunications service provider to obtain the subscriber's subscriber information and subscriber data attributes consistent with current privacy laws and other applicable rules and regulations. For instance, a subscriber 136 may give consent to the release of his or her subscriber information for use by authorized partners and/or internal departments of the telecommunications service provider via the signing of an initial services agreement or agreeing to applicable terms of use.

The computing devices described herein can comprise a plurality of physical machines such as general-purpose computers, such as desktop computers, tablet computers, laptop computers, and servers. In various embodiments, the computing devices can also comprise smartphones, mobile devices, personal digital assistants (PDAs), and/or other electronic devices that are capable of receiving input, processing the input, and generating output data. The computing devices can also comprise a plurality of virtual machines (e.g., virtual engines (VE), virtual private servers (VPS)). The computing devices may connect to a network utilizing one or more wireless base stations or any other common wireless or wireline network access technologies. For instance, the one or more networks may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth.

The wireless carrier network may include a radio access network and a core network 138. The radio access network may include multiple base stations (not pictured). The multiple base stations are responsible for handling voice and data traffic between multiple computing devices, user devices 134, and the core network 138. Accordingly, each of the base stations may provide a corresponding network cell that delivers telecommunication and data communication coverage. In some embodiments, the base stations may be in the form of eNodeB nodes. Each eNodeB node may include a base transceiver system (BTS) that communicates via an antennae system over an air-link with one or more computing devices and/or user devices 134 that are within range. The antenna system of an eNodeB node may include multiple antennas that are mounted on a radio tower to provide a coverage area that is referred to as a "cell." The BTS may send RF signals to computing devices and/or user devices 134 and receive RF signals from computing devices and/or user devices 134.

The core network 138 may use the network cells to provide communication services to the multiple computing devices and/or user devices 134. For example, the core network 138 may connect the multiple computing devices and/or user devices 134 to other telecommunication and data communication networks, such as the Internet and the public switched telephone network (PSTN). In various embodiments, the core network 138 may include one or more servers that implement network components. The 3G domain components of the core network 138 may include a serving GPRS support node (SGSN) that routes voice calls to and from the PSTN, and a Gateway GPRS Support Node (GGSN) that handles the routing of data communication between the external packet switched networks and the core network 138.

The core network 138 may further include, without limitations, a policy engine, a billing function, and a gateway. The policy engine may be a software component that determines policy and enforces policy rules and serves to establish calls and allocate bandwidth to call bearers. In various embodiments, the policy engine may be a PCRF or another equivalent core network component of the wireless carrier network. The billing function may enable the wireless carrier network to monitor the services, such as data, voice, text, etc., that are used by each subscriber 136, and charge the subscribers 136 in real-time based on service usage. In various embodiments, the billing function may be an Online Charging System (OCS) or another equivalent core network component of the wireless carrier network.

The LTE domain of the core network 138 may include an IP Multimedia Subsystem (IMS) core (not pictured). The IMS core may be accessed via one or more servers and related components that are tasked with providing connectivity between the wireless carrier network and the user devices by acting as a point of entry and exit for data traffic. In turn, the IMS core may provide the user devices with data access to external packet data networks, such as the networks of other wireless carrier networks. Accordingly, the gateway may perform functions such as policy enforcement, packet filtering, packet screening, and/or charging support. In various embodiments, the gateway may be an Evolved Packet Data Network Gateway (ePDG) or another equivalent core network component of the wireless carrier network.

The IMS core may include a Proxy Call Session Control Function (P-CSCF) or an equivalent function. The P-CSCF may route incoming SIP messages to an IMS registrar server. The P-CSCF may also safeguard the security of the IMS core by handling Internet Protocol Security (IPSec) for communications that are exchanged by with user devices. In some alternative instances, instead of SIP sessions, the P-CSCF may handle Remote Authentication Dial-In User Service (RADIUS) sessions. The P-CSCF may interact with an Interrogating CSCF (I-CSCF), and a Serving CSCF (S-CSCF). The S-CSCF may communicate with a telephony application server (TAS) that resides in the core network. The TAS may route voice and/or data communications within the wireless carrier network and with other networks, including public switch telephone networks (PSTNs). For example, the TAS may be a Session Initiation Protocol (SIP) application server that handles IP telephony for voice over LTE (VoLTE) services. Collectively, the CSCFs may handle SIP sessions, which are communication sessions for packet-based voice and video calls, instant messaging over IP networks, and/or so forth. The IMS core may also route packet data traffic to one or more backend servers.

The backend servers may include a server 126 that is operated by the wireless carrier network to distribute content, respond to information requests, and provide services. The backend servers may be equipped with a communication interface, one or more processors, memory, and server hardware. The communication interface may include wireless and/or wired communication components that enable the computing devices to transmit data to and receive data from other networked devices via a communication network. The server hardware may include additional hardware that performs user interface, data display, data communication, data storage, and/or other server functions.

The server 126 may comprise a subscriber information engine 114. The requesting entity such as an authorized partner or an aggregator may initiate a request 108 to obtain subscriber information 110 via a querying application 112 that may be native to the external requesting entity device 102, the internal requesting entity device 104, or the aggregator 106. The request 108 may be transmitted via an HTTPS connection to the subscriber information engine 114. The subscriber information engine 114 may reside in the core network 138 of the wireless carrier network. The subscriber information engine 114 may include an application program interface (API) gateway 116, a Software-as-a-Service (SaaS) platform 118, a core network services (CNS) gateway 120, a load balancer 122, and one or more databases 124. The one or more databases 124 can comprise PCRF, Home Subscriber Server (HSS)/Home Location Register (HLR), subscriber databases, an authentication database, a transaction database, and/or so forth.

The request 108 may include a public IP address of a user device 134 that belongs to a subscriber 136. Additionally, the request 108 may include an IPv6 address of the external requesting entity device 102, the internal requesting entity device 104, or the aggregator 106. The querying application 112 may send the request 108 to the subscriber information engine 114 via the API gateway 116. The API gateway 116 is a web service that exposes APIs, which the API may be called by the querying application 112 over a network to cause the SaaS platform 118 to perform functions described herein. In various embodiments, an authentication function may be provided between the API gateway 116 and the server 126 in order to prevent unauthorized requests. For example, a requesting entity must present credentials such as a user name, password, digital certificates, access tokens, etc. in a request over an encrypted HTTPS channel in order to obtain the requested subscriber information 110. Numerous authentication methods such as multi-factor authentication (MFA) can be implemented, depending upon embodiments.

The SaaS platform 118 may execute processing services that process the request. Without limitations, the processing services may include a billing function, an audit function, a routing decision function, a cache function, a transformation function, and a notification function. The billing function tracks and collects payments from one or more authorized partners that serve one or more downstream clients. The one or more clients can have a contractual relationship with an authorized partner to obtain subscriber information of its customers, wherein the customers can be subscribers of the telecommunications service provider. In this regard, a client may pay an authorized partner to utilize the subscriber information that includes MSISDNs for identity verification and fraud protection. In turn, the authorized partner may pay the telecommunications service provider for obtaining the subscriber information.

The audit function may be used by the billing function to generate invoices for one or more clients. The audit function tracks the release of subscriber information in order to generate audit reports, wherein the subscriber information can include the MSISDN information and other protected information. An audit report may indicate the information pertaining to each data release event for a subscriber. The audit report can be generated on a scheduled basis or in response to receiving a request for an audit report. In various embodiments, the audit function can utilize a transaction log 130 in a transaction database 132 that may store information relating to delivery of MSISDN information in response to a request 108. The transaction database 132 may be a part of the subscriber information engine 114. For example, the transaction log 130 may track an originator of the request 108, the data sought by the request 108, the time stamp (e.g., time and date) of the request 108 and/or response to the request 108, the data that is supplied in response to the request 108, success or failure of the request 108, reason for the failure of the request 108, and/or other information.

The routing decision function may parse and reassemble the request to verify that the appropriate data exists for the subscriber information 110 requested by the request 108. In a scenario in which the requested subscriber information 110 is an MSISDN, the routing decision function may send an MSISDN requests to the PCRF for handling. For example, the routing decision function may parse the public IP address from the request and use a public IP address-to-MSISDN mapping to obtain an MSISDN that is the subject of the request 108.

The cache function may cache retrieved subscriber information 110 of individual subscribers for repeated requests 108. Accordingly, the cache function may reduce computation workload, bandwidth usage, and/or retrieval time for the subscriber information engine 114. However, the cached subscriber information 110 of a subscriber 136 is deleted from the cache when the requesting entity is no longer an authorized partner, or the requesting entity cannot be authenticated.

The transformation function may be used by the routing decision function to transform requests into one or more queries and transform data that are obtained from one or more databases 124 (e.g., the PCRF, HSS/HLR). The transformation may include query language transformation, query format transformation, data format transformation, and/or other transformations that facilitate the processing of requests 108 to retrieve subscriber information 110.

The notification function may be used to notify a subscriber 136 of each data release event for the subscriber 136. The notification function can transmit a notification via a client application that can reside at least partially on the user device 134 of the subscriber 136. The client application can provide a graphical user interface (GUI) for enabling the subscriber to customize notification settings. For instance, the client application can provide notifications when the notification function indicates a failed or an unsuccessful request for subscriber information or when the notification function reports suspicious activities.

In some instances, a request 108 may also seek other types of subscriber information 110 or other subscriber data attributes in addition to or instead of the MSISDN of the subscriber 136. In such instances, the routing decision function can use a public IP address-to-MSISDN mapping and/or apply another mapping scheme (e.g., a public IP address-to-subscriber information mapping). Additionally, the routing decision function may send corresponding requests to other databases 124 of the wireless carrier network. For example, the other databases 124 of the network may include databases of a payment tool, a customer information tool, a customer relationship management tool, a device management tool, an enterprise resource planning tool, and/or so forth. The databases 124 may include relational databases, object databases, object-relational databases, and/or key-value databases.

The CNS gateway 120 plays a role as a go-between to enable the querying application 112 to communicate with the server 126. The CNS gateway 120 provides a set of services needed to process requests from the external requesting entity device 102, the internal requesting entity device 104, and the aggregator 106. In various embodiments, the CNS gateway 120 may also perform functions such as authentication function, scheduling function, or load balancing function with respect to the requests 108 using a method of assigning priority.

The authentication function may authenticate the requesting entity that initiated the response. The first authentication function provided by the API gateway 116 can include a first authentication protocol and the second authentication function provided by the CNS gateway 120 can include a second authentication protocol that may be different from the first authentication protocol. Additionally, the first authentication function may perform a first set of authentication operations and the second authentication function may perform a second set of authentication operations different from the first set of authentication operations.

In various embodiments, the request 108 may include authentication credentials of the requesting entity. Accordingly, the authentication function may compare the authentication credentials against the stored authentication credentials of authorized users stored in an authentication database. A match between the received and the stored authentication credentials may cause the authentication function to route the request 108 for further processing. Otherwise, the request 108 may be denied by the authentication function. The authentication of the requests 108 ensures that subscriber information 110 is protected from unauthorized access.

The CNS gateway 120 also includes a scheduling function and/or orchestration services. The scheduling function may coordinate the timely retrieval of data from multiple data sources in response to a request 108 and consolidate the retrieved subscriber information 110 into a consolidated response for transmission to a requesting entity device. Additionally, the scheduling function can facilitate batch processing or process multiple requests at once. In this way, the subscriber information engine 114 can currently support a large number of requests from a plurality of requesting entity devices.

In various embodiments, the CNS gateway 120 can provide additional services to facilitate the routing of requests to one or more databases 124. The additional services can include data adaptors, data connectors, and data caches. For example, the data adaptors may enable the retrieval of data from multiple types of databases 124 (e.g., structured or unstructured databases). The data connectors may support connectivity with databases 124 via multiple protocols, such as File Transfer Protocol (FTP), HTTPs, Java Database Connectivity (JDBC), etc. Finally, the data caches may cache retrieved subscriber information 110 of individual subscribers 136 from the one or more databases 124 for repeated requests 108. However, the cached subscriber information 110 of a subscriber 136 is deleted from the cache when a requesting entity is not an authorized partner or when a requesting entity is no longer an authorized partner (i.e., not authenticated). In this way, the carrier may provide information that helps to reduce or eliminate identity theft and unauthorized transactions while at the same time complying with governmental regulations that protect subscriber privacy.

The load balancer 122 can be operatively connected to a core network services (CNS) gateway 128 for communicating with the core network 138. The load balancer 122 may distribute requests 108 to different instances of a component in the core network 138 that is responsible for retrieving subscriber information 110 from databases 124 (e.g., the PCRF, HSS/HLR, etc.). For example, the load balancer 122 may distribute requests 108 for MSISDNs of subscribers 136 to different instances of the PCRF or another subscriber database that is responsible for retrieving the MSISDNs. In this way, no particular PCRF or subscriber database will become overwhelmed with an excessive number of requests 108, while another PCRF or subscriber database sits idle.

Example Computing Device Components

Figure 2:
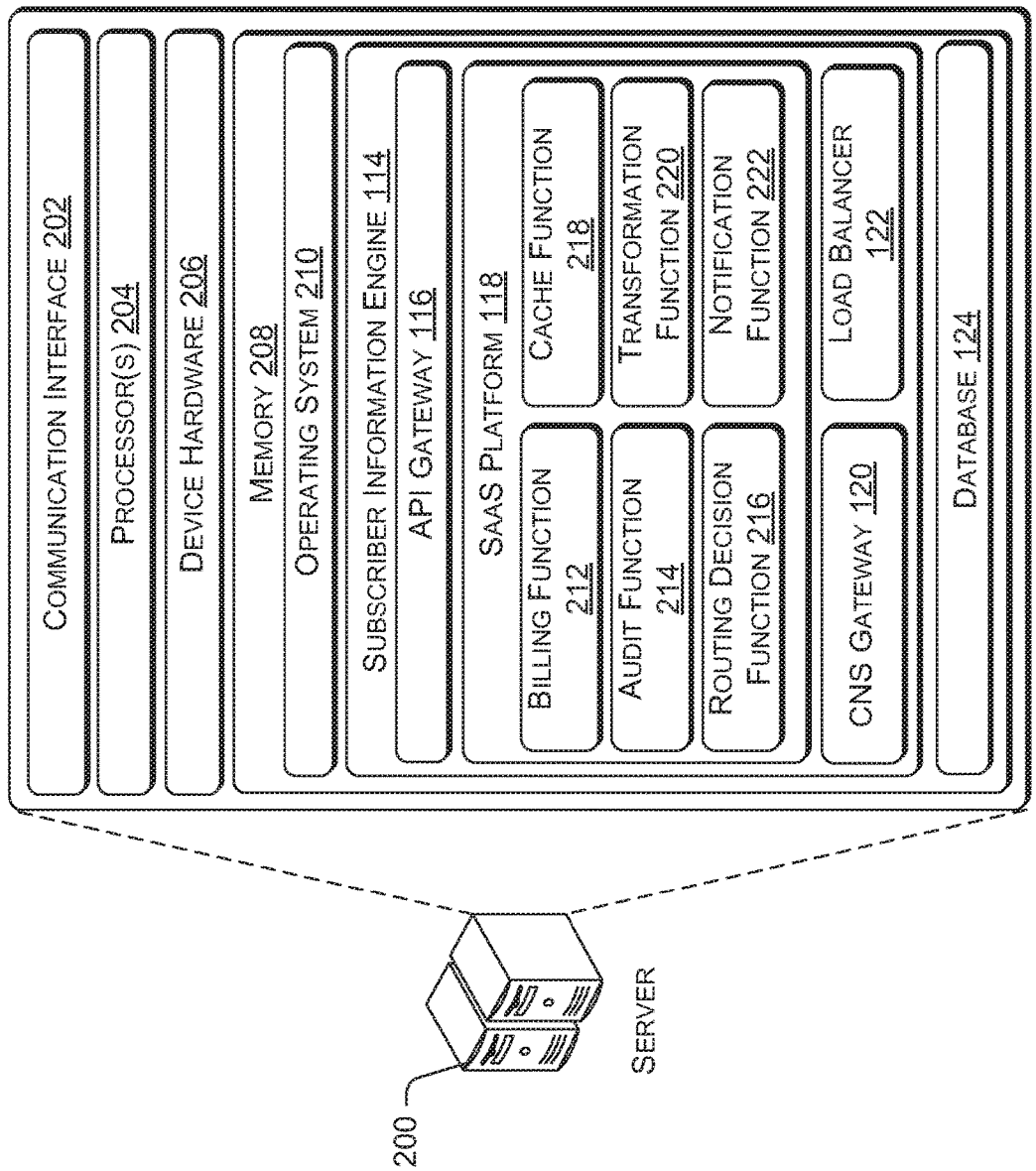
FIG. 2 is a block diagram showing various components of an illustrative computing device that is configured to receive requests for subscriber information from one or more authorized partners for identity verification and fraud prevention.

FIG. 2 is a block diagram showing various components of an illustrative computing device, wherein the computing device can comprise one or more servers 200 that are operated by a telecommunications service provider. It is noted that the server 200 as described herein can operate with more or fewer of the components shown herein. Additionally, the server 200 as shown herein or portions thereof can serve as a representation of one or more of the computing devices or the subscriber information engine of the present system.

The server 200 may include a communication interface 202, one or more processors 204, hardware 206, and memory 208. The communication interface 202 may include wireless and/or wired communication components that enable the server 200 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 204 may also be responsible for executing all computer applications stored in the memory, which can be associated with common types of volatile (RAM) and/or non-volatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, in which the computer-readable instructions may include data structures, code segments, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, code segments, program modules, or other data in a modulated data signal, such as a carrier wave, or other transmission mechanisms. The memory 208 may also include a firewall. In some embodiments, the firewall may be implemented as hardware 206 in the server 200.

The processors 204 and the memory 208 of the server 200 may implement an operating system 210 and a subscriber information engine 114. The operating system 210 may include components that enable the server 200 to receive and transmit data via various interfaces (e.g., user controls, a communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system. The server 200 can communicate with a plurality of databases. Additionally, or alternatively, the server 200 can comprise a database 124.

The subscriber information engine 114 includes a billing function 212, an audit function 214, a routing decision function 216, a cache function 218, a transformation function 220, and a notification function 222. The billing function 212 tracks and collects payments from one or more IFM providers that serve one or more clients, wherein the one or more clients can comprise a bank or a merchant The one or more clients can have a contractual relationship with the IFM providers to obtain subscriber information of its customers, wherein the customers can be subscribers of the telecommunications service provider. In this regard, a client may pay an IFM provider to license the subscriber information that includes MSISDNs for identity verification and fraud protection. The IFM provider may then pay the telecommunications service provider for licensing the subscriber information.

The billing function 212 can establish and manage a billing account for each IFM provider. The billing account for an IFM provider can comprise a profile name, payment settings, billing information such as methods of payment and billing address, and/or so forth. The payment settings can indicate the IFM provider's billing arrangements. For instance, the billing may be performed on a per request response basis, such that the IFM provider is billed a set fee for each response to a request. Other billing arrangements may include billing a set fee for each multiple (e.g., five, ten, etc.) of responses to requests. The period of time between billings can vary depending on the billing cycle. Volume-based escalated billing or discounted billing, as well as billing based on tiered pricing may also be provided, such that the fee per each request response may increase or decrease based on the number of the requests. Other billing arrangements for an IFM provider may include a recurring flat fee (e.g., weekly fee, monthly fee, etc.), a one-time fee, and/or so forth. The billing function 212 may provide monetization reports to the telecommunications service provider on a scheduled basis that calculates the fees collected and/or revenues generated from the IFM providers.

The billing function 212 can obtain from a transaction log, each subscriber data release event in response to a request in order to generate invoices to an IFM provider based on the volume of requests received from the IFM provider. The transaction log may track an originator (i.e., the IFM provider) of the request, the data sought by the request, the time stamp (e.g., time and date) of the request and/or response to the request, the data that is supplied in response to the request, success or failure of the request, reason for the failure of the request, and/or other information. Additionally, the transaction log can provide each delivery of subscriber information to the notification function 222 to transmit notifications to a user device of the subscriber.

The audit function 214 generates audit reports pertaining to the release of protected subscriber information that includes the MSISDN information. An audit report may indicate the information pertaining to each data release event for a subscriber. The information pertaining to an MSISDN release may include the identification data of the originator of the request, the data sought by the request, the time stamp (e.g., time and date) of the request and/or response to the request, the data that is supplied in response to the request, and/or other information. The identification data of the originator may include an identity of the originator, an IP address that the originator used to send the request, information on the authentication credential submitted by the originator, and/or so forth.

The audit function 214 may generate the audit reports in response to an internal audit request that is initiated within the wireless carrier network. Alternatively, the audit reports may be generated in response to an external audit request from a third party working with a telecommunications service provider. For example, the third party may be a governmental agency, a governing business body or organization, an insurance carrier, and/or so forth.

The routing decision function 216 is configured to parse the request to verify that the appropriate data exists for the subscriber information requested by the request. In a scenario in which the requested information is an MSISDN, the routing decision function may send an MSISDN requests to the PCRF for handling. In turn, the PCRF may use a public IP address-to-MSISDN mapping to obtain an MSISDN that is the subject of the request. In other embodiments, the routing decision function 216 may utilize a lookup table that is stored in a subscriber database, wherein the lookup table can comprise subscriber information that corresponds to a subscriber that is associated with a user device.

The cache function 218 may cache retrieved subscriber information of individual subscribers for repeated requests. Accordingly, the cache function 218 may reduce computation workload, bandwidth usage, and/or retrieval time for the subscriber information engine. The cached subscriber information of a subscriber can be updated such that cached subscriber information may be deleted when the requesting entity is no longer an authorized partner.

The transformation function 220 may be used by the routing decision function 216 to transform requests into one or more queries and transform data that are obtained from one or more data sources (e.g., the PCRF, HSS/HLR). For example, the transformation may include query language transformation, query format transformation, data format transformation, and/or other transformations that facilitate the processing of requests to retrieve subscriber information.

The notification function 222 can transmit a notification or an alert to a user device of a subscriber in response to a data release event for the subscriber. The notification can include the identification data of the originator of the request, the data sought by the request, the time stamp (e.g., time and date) of the request and/or response to the request, the data that is supplied in response to the request, and/or other information. The notification can be provided via a client application that can reside at least partially on the user device of the subscriber.

The CNS gateway 120 facilitates communications between the querying application and the server 200 in order to process requests for subscriber information. The CNS gateway 120 may perform functions such as authentication, scheduling, and/or load balancing with respect to the requests. The authentication function may authenticate the requesting entity that transmits a request, wherein the request may include authentication credentials of the requesting entity, such as user name, password, digital certificates, access tokens, etc. Accordingly, the authentication function may compare the authentication credentials against the stored authentication credentials of authorized users stored in an authentication database, which can comprise the data store. A match between the received and the stored authentication credentials may cause the authentication function to route the request for further processing.

The load balancer 122 may distribute requests to different instances of a component in the core network that is responsible for retrieving subscriber information from data sources (e.g., the PCRF, HSS/HLR, etc.). For example, the load balancer may distribute requests for MSISDNs of subscribers to different instances of the PCRF that is responsible for retrieving the MSISDNs. In this way, no particular PCRF instance will become overwhelmed with an excessive number of requests, while another PCRF instance sits idle when there may be multiple instances of the PCRF. Additionally, the load balancer 122 can distribute requests using round-robin scheduling, priority scheduling mechanism, and/or so forth. In various embodiments, the load balancer 122 may process requests based at least on priority or urgency criteria.

For instance, the load balancer 122 can identify required times for actions to be taken for a request. In a scenario in which the requesting entity is billed for each response to a request, the load balancer 122 can determine whether the requesting entity has outstanding balances. If the requesting entity has outstanding balances, the request can be placed in the queue of lower priority requests. In contrast, if the requesting entity does not have outstanding balances, the request can be given a higher priority.

Example Processes

Figure 3:
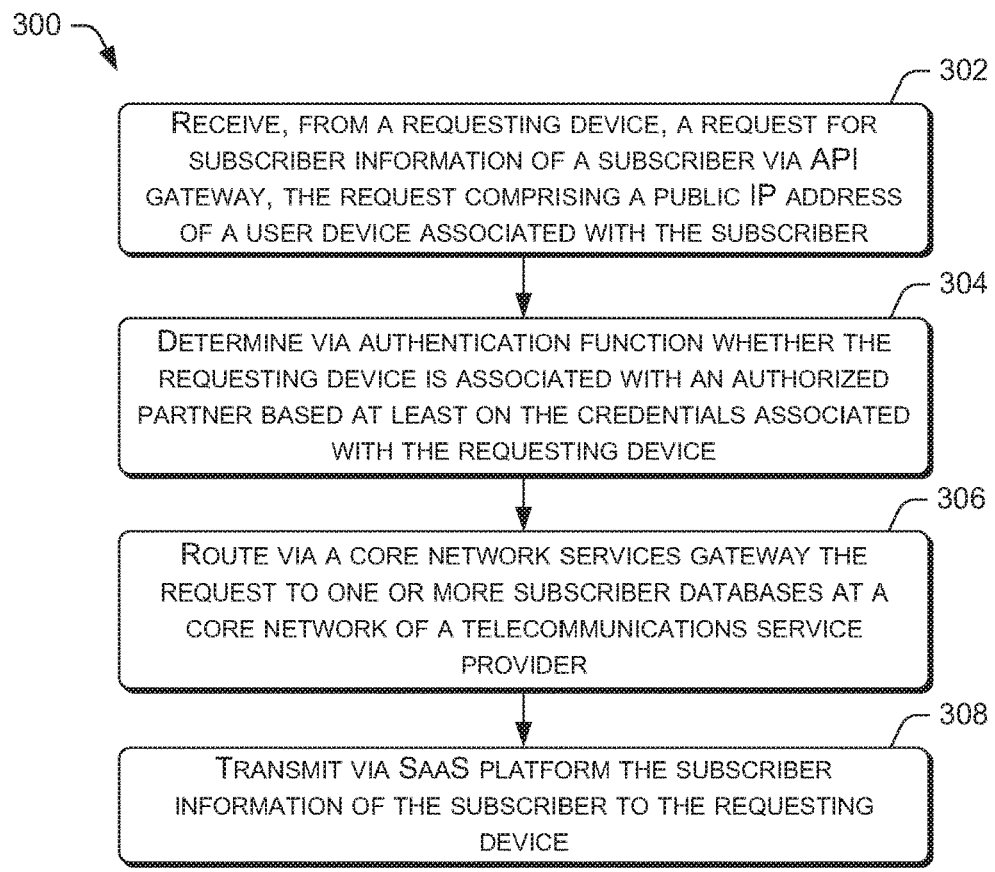
FIG. 3 is a flow diagram of an example process for processing requests for subscriber information from one or more authorized partners for identity verification and fraud prevention.
Figure 4:
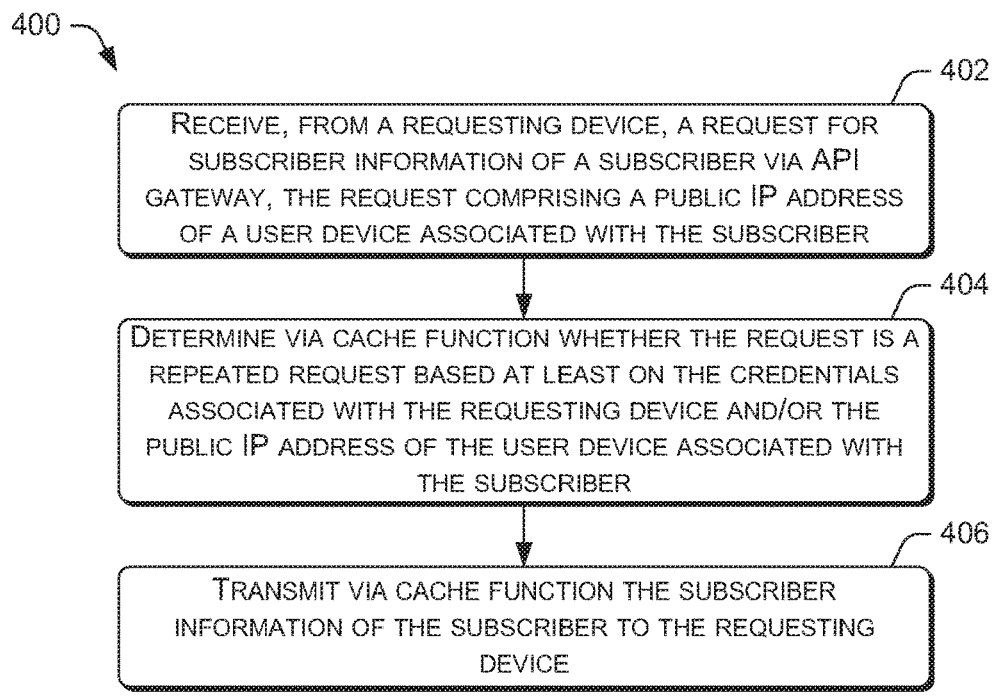
FIG. 4 is a flow diagram of an example process for processing repeated requests for subscriber information from one or more authorized partners for identity verification and fraud prevention.
Figure 5:
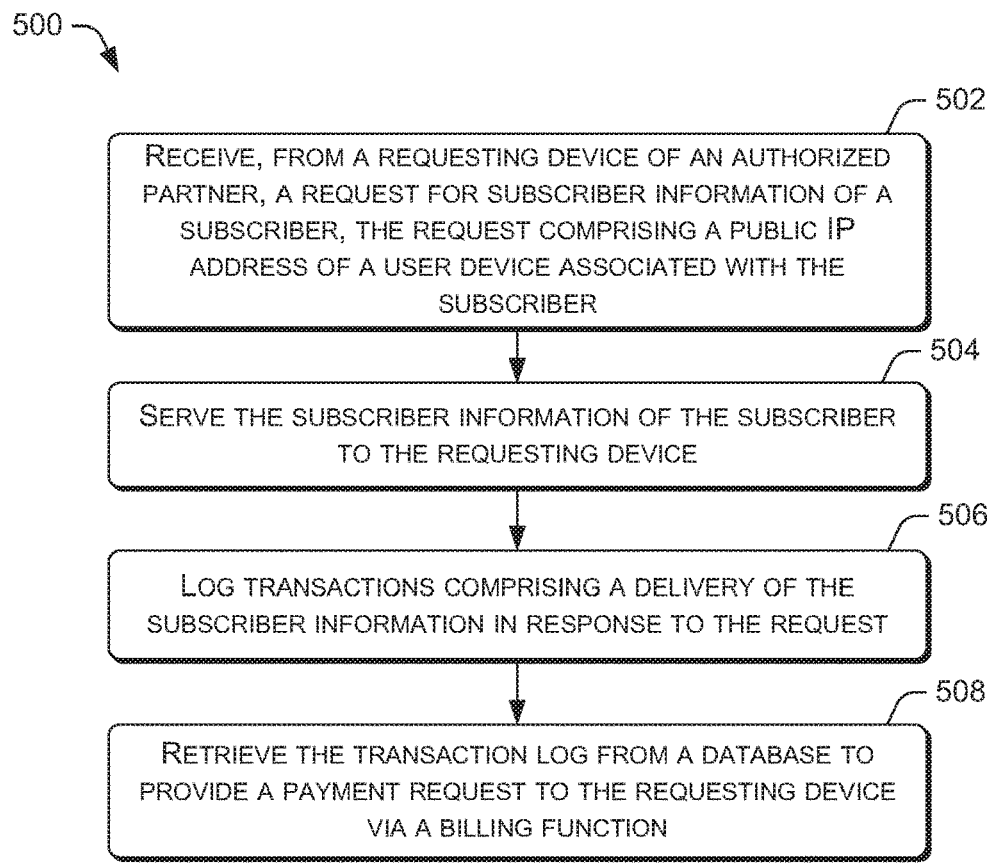
FIG. 5 is a flow diagram of an example process for performing monetization and auditing functions.

FIGS. 3 to 5 presents illustrative processes 300-500 for serving subscriber information to one or more authorized partners in response to requests. The processes 300-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, code segments, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the architecture 100 of FIG. 1.

FIG. 3 is a flow diagram of an example process 300 for processing requests for MSISDN from one or more authorized partners for identity verification and fraud prevention. At block 302, an API gateway of the subscriber information engine receives, from a requesting entity device, a request for subscriber information of a subscriber via an API gateway of a subscriber information engine, the request comprising a public IP address of a user device associated with the subscriber. In various embodiments, the subscriber information of the subscriber may include an MSISDN associated with a user device of the subscriber. A requesting entity such as an authorized partner can call the API gateway from the requesting entity device to send the request, and the request is forwarded by the API gateway to a SaaS platform for processing.

At block 304, an authentication function of the API determines whether the requesting entity device is authorized to receive the subscriber information of the subscriber based at least on the credentials associated with the requesting entity device. For example, the credentials can include access tokens. If the requesting entity device is authorized, the SaaS platform of the subscriber information engine receives the request, which is then forwarded to a CNS gateway of the subscriber information engine. If the requesting entity device is not associated with an authorized partner, the request is denied, and an error message is transmitted to the requesting entity device.

At block 306, the CNS gateway may route the request to one or more individual databases. In various embodiments, the CNS gateway may further process the request into one or more specific queries for the one or more individual databases by using data adaptors, data connectors, and/or orchestration services. In some embodiments, multiple queries may be sent by the CNS gateway to a load balancer for routing to different databases so that the appropriate database may be accessed at the appropriate time. In this way, the load balancer routes the query to the appropriate database instances for the retrieval of the requested subscriber information. For example, the CNS gateway may route a request to a specific PCRF of a plurality of PCRFs at the core network of the telecommunication service provider. In turn, the specific PCRF may use the public IP address to retrieve a corresponding MSISDN from a Public IP address-to-MSISDN mapping database accessible to the PCRF.

At block 308, the SaaS platform of the subscriber information engine transmits the subscriber information of the subscriber to the requesting entity device. The requested subscriber information is sent by the one or more databases to the load balancer for routing through the CNS gateway to the SaaS platform. The SaaS platform then routes the requested subscriber information back to the API gateway for delivery to the computing device of the requesting entity. For example, the retrieved subscriber information is delivered to the computing device of the requesting entity. In various embodiments, the SaaS platform can provide a notification to the user device of the subscriber in response to the delivery of the retrieved subscriber to the computing device of the requesting entity.

FIG. 4 is a flow diagram of an example process for processing repeated requests for subscriber information from one or more authorized partners for identity verification and fraud prevention. At block 402, the API gateway of the subscriber information engine receives, from a requesting entity device, a request for subscriber information of a subscriber via an API gateway the request comprising a public IP address of a user device associated with the subscriber. In various embodiments, the subscriber information may include an MSISDN associated with a user device of the subscriber. At block 404, a SaaS platform of the subscriber information engine determines whether the request is a repeated request based at least on the credentials associated with the requesting entity device and/or the public IP address of the user device associated with the subscriber. In various embodiments, the routing decision function may parse and reassemble the request to identify the IP address of the user device in the request.

At block 406, the SaaS platform transmits the subscriber information of the subscriber or the cached subscriber information of the subscriber to the requesting entity device via the API gateway in response to determining a match between the received and the cached IP address and/or the public IP address of the user device. In this way, the SaaS platform eliminates the need for a CNS gateway to route the request to different databases that may be accessible to the PCRF, which would enable the PCRF to use the public IP address-to-subscriber information mapping to obtain the subscriber information that is the subject of the request. In a scenario in which a requesting entity is not an authorized partner or no longer a valid authorized partner, the cached subscriber information of a subscriber is deleted. Additionally, the cache function can return an indication to the requesting entity device upon determining that the cached subscriber information of a subscriber is deleted from the cache.

FIG. 5 is a flow diagram of an example process for performing monetization and auditing functions. A client, such as a bank or a merchant, may pay an IFM provider for the use of the subscriber information that includes MSISDNs for identity verification and fraud protection. In turn, the IFM provider may provide payment to the wireless carrier network. Accordingly, the subscriber information engine may include a billing function that tracks and collects payments from the IFM providers.

At block 502, an API gateway of a subscriber information engine receives, from a requesting entity device of an authorized partner, a request for subscriber information of a subscriber, the request comprising a public IP address of a user device associated with the subscriber. In various embodiments, the subscriber information may include an MSISDN associated with a user device of the subscriber. At block 504, a SaaS platform of the subscriber information engine serves the subscriber information of the subscriber to the requesting entity device. At block 506, a transaction log stores delivery of the subscriber information in response to the request. At block 508, the subscriber information engine retrieves the transaction log from a database (e.g., a transaction database) to provide a payment request to the requesting entity device (e.g., of an IFM provider) via a billing function for the delivery of the subscriber information or other data pertaining to subscriber data attributes. The transaction log can comprise information relating to an originator of the request, the data sought by the request, the time stamp (e.g., time and date) of the request and/or response to the request, the data that is supplied in response to the request, success or failure of the request, reason for the failure of the request, and/or other information pertaining to the transaction.

Various billing models can be implemented, depending upon embodiments. In one example, the requesting entity can be billed a set fee for each request-response or for each set of request responses. Tiered and/or volume pricing may also be implemented. For tiered pricing, the fee per each request response may increase or decrease based on the volume of the requests in each tier. For volume pricing, the fee per each request response may increase or decrease based on the total volume of the requests. Other billing arrangements for an IFM provider may include a recurring flat fee (e.g., weekly fee, monthly fee, etc.), a one-time fee, and/or so forth. The billing function may provide monetization reports that calculate the fees collected and/or revenues generated from the IFM providers on a scheduled basis.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving, from a requesting entity device, a request for subscriber information of a subscriber of a telecommunications service provider, the request comprising a public Internet Protocol (IP) address of a user device associated with the subscriber;
   determining whether the requesting entity device is associated with an authorized partner based at least on one or more credentials associated with the requesting entity device;
   in response to determining that the requesting entity device is associated with the authorized partner, routing the request to at least one subscriber database of a plurality of subscriber databases of the telecommunications service provider to obtain the subscriber information using the public IP address of the user device; and
   transmitting the subscriber information of the subscriber to the requesting entity device.

2. The one or more non-transitory computer-readable media of claim 1, wherein the acts further comprise:
   determining whether the request is a repeated request based at least on the one or more credentials associated with the requesting entity device and the public IP address of the user device associated with the subscriber; and
   in response to determining that the request is the repeated request, transmitting cached subscriber information of the subscriber of the requesting entity device.

3. The one or more non-transitory computer-readable media of claim 1, wherein the acts further comprise:
   logging transactions in a transaction log that stores data on one or more deliveries of the subscriber information in response to the request.

4. The one or more non-transitory computer-readable media of claim 3, wherein the acts further comprise:
   transmitting a payment request to the requesting entity device for delivery of the subscriber information.

5. The one or more non-transitory computer-readable media of claim 1, wherein the subscriber information includes a Mobile Station International Subscriber Directory Number (MSISDN).

6. The one or more non-transitory computer-readable media of claim 1, wherein the one or more credentials comprise access tokens.

7. The one or more non-transitory computer-readable media of claim 1, wherein the authorized partner is an identity fraud management (IFM) provider.

8. The one or more non-transitory computer-readable media of claim 1, wherein the at least one subscriber database comprises an IP address-to-Mobile Station International Subscriber Directory Number (MSISDN) mapping database that is accessible to a Policy and Charging Rules Function (PCRF), and wherein the routing comprises routing the request comprising the public IP address of the user device to the PCRF to obtain an MSISDN of the subscriber.

9. A computer-implemented method, comprising:
   receiving, from a requesting entity device, a request for subscriber information of a subscriber of a telecommunications service provider, the request comprising a public Internet Protocol (IP) address of a user device associated with the subscriber;
   determining whether the requesting entity device is associated with an authorized partner based at least on one or more credentials associated with the requesting entity device;
   in response to determining that the requesting entity device is associated with the authorized partner, routing the request to at least one subscriber database of a plurality of subscriber databases of the telecommunications service provider to obtain the subscriber information using the public IP address of the user device; and
   transmitting the subscriber information of the subscriber to the requesting entity device.

10. The computer-implemented method of claim 9, further comprising:
    determining whether the request is a repeated request based at least on the one or more credentials associated with the requesting entity device and the public IP address of the user device associated with the subscriber; and
    in response to determining that the request is the repeated request, transmitting cached subscriber information of the subscriber of the requesting entity device.

11. The computer-implemented method of claim 9, further comprising:
    logging transactions in a transaction log that stores data on one or more deliveries of the subscriber information in response to the request.

12. The computer-implemented method of claim 11, further comprising:
    transmitting a payment request to the requesting entity device for the delivery of the subscriber information.

13. The computer-implemented method of claim 9, wherein the subscriber information includes a Mobile Station International Subscriber Directory Number (MSISDN).

14. The computer-implemented method of claim 9, wherein the request utilizes an identifier correlating with an account that is associated with the user device and a plurality of users.

15. The computer-implemented method of claim 9, wherein the authorized partner is an aggregator.

16. The computer-implemented method of claim 9, wherein the at least one subscriber database comprises an IP address-to-Mobile Station International Subscriber Directory Number (MSISDN) mapping database that is accessible to a Policy and Charging Rules Function (PCRF), and wherein the routing comprises routing the request comprising the public IP address of the user device to the PCRF to obtain an MSISDN of the subscriber.

17. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
receive, from a requesting entity device, a request for a Mobile Station International Subscriber Directory Number (MSISDN) of a subscriber of a telecommunications service provider, the request comprising a public Internet Protocol (IP) address of a user device associated with the subscriber;
determine whether the requesting entity device is associated with an authorized partner based at least on one or more credentials associated with the requesting entity device;
in response to determining that the requesting entity device is associated with the authorized partner, route the request to at least one IP address-to-Mobile Station International Subscriber Directory Number (MSISDN) mapping database that is accessible to a Policy and Charging Rules Function (PCRF) of the telecommunications service provider to obtain the MSISDN using the public IP address of the user device; and
transmit the MSISDN of the subscriber of the requesting entity device.

18. The system of claim 17, wherein the one or more processors are further configured to:
determine whether the request is a repeated request based at least on the one or more credentials associated with the requesting entity device and the public IP address of the user device associated with the subscriber; and
in response to determining that the request is the repeated request, transmit a cached MSISDN of the subscriber of the requesting entity device.

19. The system of claim 17, wherein the one or more processors are further configured to:
log transactions in a transaction log that stores data on one or more deliveries of the MSISDN in response to the request; and
transmit a payment request to the requesting entity device for the delivery of the MSISDN.

20. The system of claim 17, wherein the one or more processors are further configured to:
transmit a notification to the user device, the notification indicating delivery of the MSISDN of the subscriber to the requesting entity device.

* * * * *